Patented Dec. 3, 1940

2,223,392

UNITED STATES PATENT OFFICE 2,223,392

ABRASIVE ARTICLE AND METHOD OF MAKING THE SAME

Robert L. Smith, Niagara Falls, N. Y., assignor to The Carborundum Company, Niagara Falls, N. Y., a corporation of Delaware No Drawing. Application May 10, 1937, Serial No. 141,709

4 Claims. (Cl. 51—298)

This invention relates to improved abrasive articles and methods of manufacturing the same. The invention is also directed to the development of an improved binder for abrasive grains and a method of making such a binder, particularly a binder formed by reaction of a phenolic condensation product with a strong alkali.

The invention is directed to abrasive articles of various kinds such as bonded abrasive articles in the nature of wheels or stones, as well as with coated abrasive articles such as sandpaper. In all cases the binder for the grains, whether the bond which unites the mass of grains together as is the case with the abrasive wheel, or the binder for attaching a thin layer of grains to a backing in making articles of the general character of sandpaper, comprises a new composition of matter which I have developed and which is particularly adapted to the production of abrasive articles.

Abrasive articles have been made in the past with a great variety of bonds and adhesives, the expression "bond" generally being applied to the binder for uniting grains into a mass, while in producing sandpaper the binder which unites the grains to the backing is frequently spoken of as an "adhesive." In making bonded articles many different types of compostions have been employed such as ceramic materials, vulcanized rubber and various classes of resins, such as the phenolic condensation products and natural resins such as shellac. Glue is the adhesive which has been the most commonly used in making sandpaper although other types of adhesives have been employed to a greater or less extent, such as oil varnishes for making waterproof sandpaper and, to a minor extent, synthetic resin, such as phenol aldehyde condensation products.

The binder with which my invention is concerned is formed by the reaction of a phenol aldehyde condensation product with strong alkali, by which is meant a hydroxide which, in dilute solution in water, is ionized substantially 100% such as a hydroxide of the alkali group of the Periodic System of chemical elements. It has been known that certain phenol aldehyde condensation products can be dissolved in aqueous alkalies to form aqueous colloidal suspensions or dispersions of resinous products as exemplified in a patent to Baekeland No. 1,085,100. My improved binder is to be distinguished from such solutions or suspensions of resins since the properties of the binder are such as to indicate that a chemical reaction occurs between the phenol aldehyde condensation product and the alkali in the preparation of the binder.

In making up my improved binder I start with a normally solid phenolic resin, such as the resin obtained by the reaction of phenol and formaldehyde in accordance with the well known methods originally devised by Baekeland. I prefer to use as the resinous raw material for my binder such a product in the so-called solid "A" stage where the resin is both fusible and soluble in common organic solvents, such as alcohol or acetone. I may however employ a solid product which is somewhat advanced toward the final or "C" stage and is in what is referred to as the "B" stage where the resin is no longer fusible but is softenable by heat.

Having selected a suitable phenolic resin of the character just described, I proceed to react this resin with a strong alkali such as caustic soda or caustic potash which has been put into aqueous solution. The method employed in bringing about the reaction comprises mixing the resinous material with the aqueous alkali solution and heating the mixture. The heating of the solid resin with the aqueous alkali is continued for a period of several hours. During this time it will be found that the solid resin first becomes dissolved in the aqueous alkali to form a solution which is a reddish-brown in color and which, upon continued heating, gradually changes to a dark red. After the water is removed from such a solution it will be found that the product resulting from this treatment is infusible, is still soluble in water and that unlike the ordinary phenolic resin, the material cannot be made insoluble by continued heating.

If the proper portions of alkali and resin are used in making the new product, the solution obtained by this treatment will be substantially neutral to mildly alkaline in character. These properties lead me to believe that the treatment has effected a reaction between the alkali and the resinous material to form a composition in the nature of a chemical compound. Consequently in describing and claiming the product I have chosen to call it a "thermal reaction product of a phenolic resin with an alkali."

The proportions of alkali and resin which are used are subject to some degree of variation depending upon the composition of the alkali as well as the kind of alkali which is employed. For example, where caustic soda is the alkali it may be employed in the proportion of from about 12 to 25 parts of alkali to about 88 to 75 parts of resin while if caustic potash is substituted for caustic soda the proportion of alkali is increased in the ratio of their molecular weights, or as 56 to 40. Likewise the concentration of the alkaline solution may be varied within certain degrees and the length of time during which the mixture is heated is also subject to some variation. In general I have found that the product obtained by reacting about 20 parts of caustic soda with 80 parts of an "A" stage phenolic resin gives a satisfactory solution of the reaction product provided that the amount of water employed is such as to make a solution of the product with a concentration of from about 35 to 55%, preferably in the range of from 40 to 45%. I have found that if more than about 25 parts of caustic soda to 75 parts of resin are employed the solution of the reaction product becomes strongly alkaline and it therefore appears that the necessary reactive proportions are approximately 25 parts of alkali to 75 parts of resin. On the other hand, if the proportion of alkali is much less than about 12 to 88 parts of resin, the solution which is obtained tends to become unstable and to gel when it is heated for a long time. Likewise a solution which is too concentrated gels on continued heating. On the other hand, if the proportions of alkali to resin and the concentration of the solution is within the range which I have indicated, the solution of the compound is remarkably stable.

I have observed that if a solution of a reaction product is made by reacting 20 parts of caustic soda with 80 parts of resin and the proportions are such that the concentration is approximately 40 to 45%, the solutions are very stable. For example, I have mixed a resin with a solution of caustic soda in proportions to give such a concentration and heated the mixture for 8 hours at 175° F. and found that there was no tendency for the solution to gel. In carrying out this treatment I remove some of the product after the mixture has been heated for about 1½ hours at 175° F. at which time it will be found that the resin has completely gone into solution. A film deposited from the solution at this stage is decidedly brittle but by heating the solution for an additional 3 hours at 175° F. I obtain a solution which deposits a film which is much less brittle and which is still water-soluble. When this film is further heated for a period of 8 hours at 350° F. the material is apparently unchanged as it is still soluble in water. This shows that there has been a reaction between the caustic soda and the phenolic resin, since otherwise the resin would be converated to the well known "C" stage where it would be insoluble in all solvents as well as infusible.

My new composition is adapted for use in many ways in the production of abrasive articles. Most resin bonded abrasive articles are prepared by first moistening the abrasive with a resin solvent, such as furfural or with a normally liquid "A" stage resin, and then adding powdered resin to make a dry, workable mixture. I have found that these solutions of my reaction product are well adapted for use as a wetting agent for such abrasive mixtures in place of the furfurol or liquid resin.

The solutions are also useful in the manufacture of coated abrasives, such as sandpaper, in which case they may be advantageously mixed with other adhesives, such as polymerized vinyl alcohol and sodium silicate, or with normally liquid phenolic resins. In addition to modifying the properties of the binder which is deposited upon solidification of the liquid adhesive, my new solutions have also been found to be very useful in improving the compatibility and stability of mixtures of other adhesives. For example, it has been found that if an aqueous solution of polymerized vinyl alcohol is mixed with sodium silicate, the mixture tends to coagulate. I have been able to stabilize such mixtures and to make them adapted for application to backings in the manufacture of coated abrasives by incorporating a small proportion of a solution of my reaction product. In carrying out this method, I usually mix the solution of reaction product with the adhesive which is used in the greater proportion and then add to this mixture the minor proportion of the adhesive which has been previously suspended or dissolved in water.

I will now illustrate my invention by reference to a number of specific examples, it being understood that the examples are for illustrative purposes only and are not limitative.

Example I

A solution of thermal reaction product is prepared by treating a mixture of 80 parts of a solid "A" stage phenol formaldehyde condensation product with 20 parts of sodium hydroxide dissolved in 200 parts of pater. The resin is in pulverized condition and the mixture of pulverized resin and alkali solution is stirred at ordinary temperatures for about ½ hour. The temperature of the mixture is then raised to 175° F. over a period of 1 hour while continuing stirring, at which time the resin has completely gone into solution in the alkali to form a reddish-brown liquid. Heating is continued at 175° F. for an additional 4 hours during which time the color of the solution changes to a dark red. The resulting product is an aqueous solution of my new resin reaction product and is very mildly alkaline.

Example II 525 grams of caustic potash are dissolved in 4400 cc. of water and the solution is mixed with 2500 grams of pulverized solid "A" stage phenol aldehyde condensation product. The mixture is treated according to the procedure outlined under Example I and the resulting product is a solution of a potassium reaction product of a phenolic resin.

Example III

An adhesive for use in the manufacture of coated abrasives may be prepared in which the composition of the constituents is as follows:

| | Parts |
|---|---|
| Polymerized vinyl alcohol | 63 |
| Alkali reaction product of a phenolic resin | 16½ |
| Sodium silicate | 12½ |
| "Sil-O-Cel" | 8 |

The method used in preparing the liquid adhesive consists of the following steps: 470 grams of an aqueous solution of sodium silicate in which the ratio of $Na_2O$ to $SiO_2$ is 1 to 3.2 and which contains 38% of solids and 62% water are mixed to a smooth paste with 132 grams of "Sil-O-Cel". 600 grams of a 45% solution of alkaline resin reaction product are then stirred in and the mixture is warmed to about 100° F. The resulting mixture is then added to 4300 grams of a 25% solution of polymerized vinyl alcohol in water.

Example IV

A liquid adhesive for use in the manufacture of coated abrasives in which the principal constituent is sodium silicate is prepared in the following manner:

1200 grams of a 15% solution of polymerized vinyl alcohol is mixed into a paste with 400 grams of "Sil-O-Cel" and 1190 grams of a sodium reaction product of a phenolic resin dissolved in water in such proportions as to contain 45% solids is added to the paste, which has been warmed. To this mixture there is then added a liquid obtained by mixing 712 grams of sodium silicate of the composition referred to in the preceding example with 1424 grams of a sodium silicate solution containing 54% solids and 46% water, the ratio of $Na_2O$ to $SiO_2$ being 1 to 2.

*Example V*

A coated abrasive is prepared by first coating a paper backing with a layer of liquid adhesive described in Example IV, distributing abrasive grains over the adhesive coated surface, drying the liquid adhesive, sizing the coated surface with a solution prepared according to Example IV and further diluted with 1 part of water to 2 parts of the adhesive. The coated article is then first dried and finally baked at 250° F. for 3 hours.

*Example VI*

A resin bonded wheel is made by first wetting 85 parts of 50 grit fused alumina with 4 parts of a sodium reaction product of a phenol resin prepared in accordance with Example I. After mixing the liquid material with the grains, 12 parts of a pulverized solid "A" stage phenolic resin are added to the mix and stirred until there is obtained a dry distributable mixture of grains which are individually coated with the pulverized resin. A wheel is cold molded from this mixture under a pressure of 2000 lbs./sq. in., the molded article is removed from the mold and is heat treated for 16 hours at 350° F.

*Example VII*

A rubber bonded abrasive article is prepared by incorporating into a mass of rubber a pulverized sodium reaction product of a phenolic resin obtained by removing water from the solution prepared in accordance with Example I. The resin reaction product is added to the rubber in proportion of 10 parts of the reaction product to 90 parts of rubber and the bond thus prepared is incorporated with abrasive grains by milling in the well known manner. A wheel is cut from the mixture so prepared and vulcanized in the usual way.

As I have indicated, my new resin reaction products are adapted for many purposes in the abrasive industry. They are inherently somewhat brittle and are not satisfactory for all types of bonds without admixing with other well known bonds and when used primarily as a constituent of a bond, the function is usually to impart brittleness to the abrasive bond. Alternatively the resin reaction products may be applied as a final or sizing coating to coated abrasive products in which cases it has been found that the brittleness and infusibility of the products aid in keeping bond clearance and in preventing loading of fusible bonds.

In addition to this function the solutions of the resins have the properties of stabilizing aqueous solutions of adhesives of the character sometimes used in making coated abrasives and are especially useful in promoting compatibility of otherwise incompatible solutions. The use of the solutions of the resin reaction products for this purpose is illustrated in Examples III and IV. Where they are so used it is sometimes desirable, as indicated by the examples, to introduce a filler having a somewhat absorbent character, such as the "Sil-O-Cel" described in the examples, as this type of material appears to promote the compatibility of the mixtures.

The solutions of the alkali reaction products of resins have also been found to be very useful in the preparation of coated abrasives where the adhesive is primarily a solution of sodium silicate. These silicates contain water of composition when they have been dried and the solid adhesive deposited by evaporation and baking of the coated articles is subject to attack by gases present in the atmosphere such as carbon dioxide and oxides of sulphur, particularly when the atmosphere is humid. This chemical reaction of the silicate with the gases and possibly with water vapor in the atmosphere tends to cause deterioration of the binder and consequent loss in efficiency of the abrasive product. When solutions of these alkali resin reaction products of my invention are admixed with sodium silicate solutions the reaction products cause gelatinization and possibly dehydration of the silicate when the liquid adhesive is being dried. I have observed that the reaction products are miscible with aqueous alkali silicates up to a certain critical concentration and if the concentration is exceeded the silicate is gelled or coagulated. It therefore appears to me that when these mixtures are dried the resin reaction product throws out the sodium silicate when this critical concentration is reached and the resulting solidified silicate has been found to be more resistant to the action of the atmosphere than is the case where sodium silicate alone is used as the binder.

I have also found that solutions of resin reaction products are useful in the coating of set-up wheels, as a temporary binder for bonded abrasive articles employing a ceramic bond, and as a constituent of the bond of articles bonded principally with sodium silicate.

I have described the preparation of my new compositions in some detail and I have also shown examples of how they may be used in the preparation of abrasive articles. I wish it to be understood however that my invention is not limited to the specific compositions or procedures shown in these examples but that it may be practiced in general as defined by the appended claims.

I claim:

1. An abrasive article comprising abrasive grains and a binder for said grains comprising a thermal reaction product of a phenolic resin with an alkali.

2. In a method of making abrasive articles, the step which comprises bonding abrasive grains with a binder comprising a thermal reaction product of a phenolic resin with an alkali.

3. An abrasive article comprising abrasive grains and a binder for said grains comprising a water-soluble and infusible thermal reaction product of a normally solid "A" stage phenolic resin with an alkali.

4. An abrasive article comprising abrasive grains and a binder for said grains comprising the water-soluble and infusible thermal reaction product of 12–25 parts of NaOH with 88–75 parts of a normally solid "A" stage phenol-aldehyde condensation product.

ROBERT L. SMITH.